(No Model.)
O. LARSON & C. BRANZELL.
COMBINED NUT AND PIPE WRENCH.
No. 601,970. Patented Apr. 5, 1898.
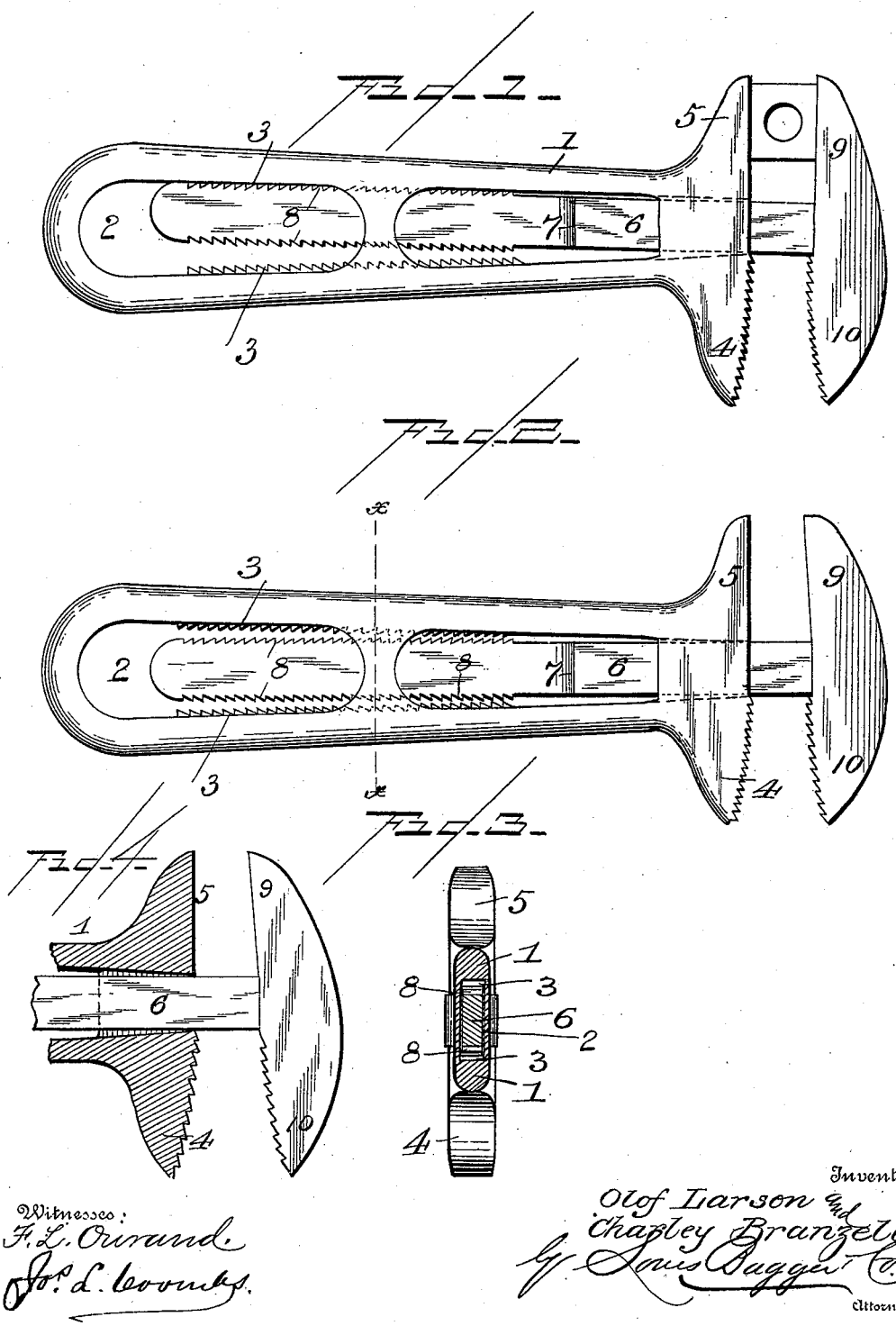

UNITED STATES PATENT OFFICE.

OLOF LARSON AND CHARLEY BRANZELL, OF ASHLAND, WISCONSIN, ASSIGNORS OF PART TO CHARLEY ELLISON, S. GUST PETERSON, AXEL FRIDSTROM, JOHN SUNDELL, MONSOS & LARSON, WALFRID NYSTROM, AND ANDREW C. ANDERSON, OF SAME PLACE.

COMBINED NUT AND PIPE WRENCH.

SPECIFICATION forming part of Letters Patent No. 601,970, dated April 5, 1898.

Application filed July 7, 1897. Serial No. 643,743. (No model.)

*To all whom it may concern:*

Be it known that we, OLOF LARSON and CHARLEY BRANZELL, citizens of the United States, and residents of Ashland, in the county of Ashland and State of Wisconsin, have invented certain new and useful Improvements in a Combined Monkey and Pipe Wrench; and we do hereby declare that the following is a full, clear, and exact description of the invention, which will enable others skilled in the art to which it appertains to make and use the same, reference being had to the accompanying drawings, which form a part of this specification.

Our invention relates to combined monkey and pipe wrenches; and its object is to provide an improved construction of the same in which the movable jaw can be easily and rapidly adjusted and when adjusted will be readily held in place.

The invention consists, essentially, in a handle formed with a central longitudinal recess the opposite edges of which are provided with rack-teeth and having a stationary serrated and a plain jaw at one end, a movable shank provided with rack-teeth on opposite edges adapted to engage with the teeth of the handle and formed with jaws corresponding with the jaws of the handle, as hereinafter fully described and claimed.

In the accompanying drawings, Figure 1 is a side elevation of a wrench constructed in accordance with our invention, showing the same as in use as a nut-wrench. Fig. 2 is a similar view showing the teeth of the shank and handle disengaged, so as to allow the movable jaw to be adjusted. Fig. 3 is a transverse section on the line *x x*, Fig. 3. Fig. 4 is a detail longitudinal section.

In the said drawings the reference-numeral 1 designates a metal handle formed with a central recess 2. The edges of the recess or opening are formed with a number of rack-teeth 3. At one end the handle is formed with a serrated jaw 4 and a plain jaw 5.

The numeral 6 designates a shank formed with a shoulder 7 and a number of teeth 8. This shank fits and is movable in the opening in the handle and at its outer end is formed with a plain jaw 9 and a serrated jaw 10, corresponding with jaws 5 and 4.

In use the shank can be moved so as to adjust the jaws 9 and 10 as required by disengaging the teeth from the teeth of the handle. When so adjusted and a nut, pipe, or other article grasped by the jaws, the teeth of said shank and handle will be engaged, as seen in Fig. 1, securely holding the shank and jaw in place.

It will be noticed that when the teeth on one side of the shank engage with the adjoining teeth of the handle the opposite side of the shank will engage with the outer edge of the opening in the handle, and thus be pivoted or fulcrumed at that point.

It will also be noticed that the opening in the end of the handle through which the shank passes is made tapering or converging toward its outer end, so that the said end will form the fulcrum for the shank, enabling the latter to rock thereon in order to engage with either of the sets of rack-teeth.

Having thus fully described our invention, what we claim is—

In a combined monkey and pipe wrench, the combination with the handle having stationary jaws at the end and formed with a central recess forming rigidly-connected arms, having rack-teeth in the inner edges and said handle at the front end with a tapering opening, of the shank passing through said opening and having jaws at one end, and formed with rack-teeth on opposite sides or edges, substantially as described.

In testimony that we claim the foregoing as our own we have hereunto affixed our signatures in presence of two witnesses.

OLOF LARSON.
CHARLEY BRANZELL.

Witnesses:
JOHN LITONIUS,
WM. NORDSON.